United States Patent [19]
Paffenholz et al.

[11] Patent Number: 6,021,092
[45] Date of Patent: Feb. 1, 2000

[54] METHOD FOR DERIVING SURFACE CONSISTENT REFLECTIVITY MAP FROM DUAL SENSOR SEISMIC DATA

[75] Inventors: Josef Paffenholz, Missouri City; Ronald E. Chambers; Frederick J. Barr, both of Houston, all of Tex.

[73] Assignee: Western Atlas International, Inc., Houston, Tex.

[21] Appl. No.: 08/871,505

[22] Filed: Jun. 9, 1997

[51] Int. Cl.[7] ..................................................... G01V 1/38
[52] U.S. Cl. ............................................... 367/24; 367/21
[58] Field of Search ................................ 367/21, 24, 15, 367/87, 16, 48, 46; 181/122

[56] References Cited

U.S. PATENT DOCUMENTS

| | | | |
|---|---|---|---|
| 5,173,879 | 12/1992 | Cung et al. | 367/46 |
| 5,396,472 | 3/1995 | Paffenholz | 367/24 |
| 5,524,100 | 6/1996 | Paffnerholz | 367/21 |
| 5,625,150 | 4/1997 | Greene et al. | 367/24 |

*Primary Examiner*—Christine K. Oda
*Assistant Examiner*—Anthony Jolly
*Attorney, Agent, or Firm*—Gerald E. Lester

[57] ABSTRACT

A method for determining water bottom reflectivities whereby pressure signals and velocity signals are combined to generate combined signals having signal components representing downwardly-travelling energy substantially removed. The pressure and velocity signals correspond to seismic waves generated at source locations n in a water layer and detected by co-located pressure and velocity receivers at receiver locations m in the water layer. The combined signals correspond to each pairing of source location n and receiver location m. The combined signals are transformed from the time domain to the frequency domain, generating transformed signals. A source peg-leg term and a receiver peg-leg term is calculated for each transformed signal, generating filtered signals. An optimization algorithm is applied to the filtered signals, using the corresponding source and receiver peg-leg terms to determine the water bottom reflectivity values $R_n$ and $R_m$ at the source locations n and the receiver locations m, respectively.

18 Claims, 5 Drawing Sheets

METHOD FOR DERIVING SURFACE CONSISTENT REFLECTIVITY MAP FROM DUAL SENSOR SEISMIC DATA

BACKGROUND OF THE INVENTION

1. Field of the Invention

The present invention relates generally to marine seismic prospecting and, more particularly, to a method for using production Dual Sensor seismic data to determine water bottom reflectivity in a surface consistent manner, that is, determining the different values at different locations.

2. Description of the Related Art

In marine seismic prospecting, a seismic survey ship is equipped with at least one energy source and at least one receiver for taking seismic profiles of an underwater land configuration. The act of taking profiles is often referred to as "shooting" or taking "shots" due to the fact that explosive devices had been commonly used for many years as energy sources. An energy source is designed to produce compressional waves that propagate through the water and into the underwater subterranean land formations. As the compressional waves propagate through the subterranean formations, they strike interfaces between formations, commonly referred to as strata, and reflect back through the earth and water to a receiver. The receiver typically converts the detected waves into electrical signals which are later processed into an image that provides information about the structure of the subterranean formations.

Presently, one of the most common marine energy sources is an air gun that discharges air under very high pressure into the water. The discharged air forms an energy pulse which contains frequencies within the seismic range. Another marine energy source which is frequently used is a marine vibrator. Marine vibrators typically include a pneumatic or hydraulic actuator that causes an acoustic piston to vibrate at a range of selected frequencies.

Just as different energy sources may be used to generate acoustic waves in marine applications, different receivers may be used to detect reflected acoustic waves. The receivers most commonly used in marine seismic prospecting are hydrophones. Hydrophones convert pressure waves into electrical signals that are used for analog or digital processing. The most common type of hydrophone includes a piezoelectric element which converts physical signals, such as pressure, into electrical signals. Hydrophones are usually mounted on a long streamer which is towed behind the survey ship at a depth of tens of feet.

Alternatively, marine seismic prospecting may use different types of receivers which detect different characteristics of the environment. For instance, in Dual Sensor bottom cable seismic recording, a combination of pressure sensitive transducers, such as hydrophones, and particle velocity transducers, such as geophones, are deployed on the marine bottom. Geophones are typically used in land operations where metal spikes anchor the geophones to the ground to maintain correspondence of geophone motion to ground motion. In marine applications, however, anchoring the geophones is difficult. Typically, therefore, cylindrical gimbal geophones are attached to the bottom cable. After the cable is deployed from the seismic survey ship, the geophones lie in contact with the marine bottom where they fall. The gimbal mechanism inside the cylinder orients the geophone element vertically for proper operation. Typically, miles of bottom cable are deployed in a planned pattern such as a single line or several substantially parallel lines.

The use of water bottom cables is particularly effective in obtaining full three dimensional coverage in areas too shallow or too congested with obstacles for gathering seismic data with a towed streamer. While the bottom cable technique allows access to areas denied by the towed streamer method, an additional, unwanted "ghost" reflection from the air water interface, along with subsequent reverberations, occurs for each primary reflection wave. The time delay between the primary reflection signal and the ghost reflection signal is greater with the bottom cable method than with the towed streamer method because the detectors are farther removed from the air-water interface, except in shallow water.

Two basic approaches have been proposed for eliminating the ghost reflection. The first approach involves recording signals from detectors at different depths and performing a wavefield separation. The second, and operationally more straightforward, approach, utilizes co-located pairs of pressure and velocity detectors, as in, for example, U.S. Pat. No. 2,757,356, "Method and Apparatus for Canceling Reverberations in Water Layers", issued to Hagarty. This second approach capitalizes upon the fact that pressure and velocity detectors generate signals which are the same polarity for upward travelling waves but are of opposite polarity for downward travelling waves, that is, the ghost reflections. This indicates that the two signals can be properly scaled and summed to eliminate the unwanted reverberations associated with each reflection. In the frequency domain, this relationship expresses itself in the complimentary amplitude spectra of the two sensors. When the signals are properly summed, a smooth amplitude spectrum results.

U.S. Pat. No. 4,979,150, issued to present co-inventor Barr, assigned to the assignee of the present invention, and entitled "Method for Attenuation of Water-Column Reverberations" describes a Dual Sensor bottom cable method for attenuating the unwanted water column reverberations associated with each reflection signal in the seismic data by combining the pressure and velocity signals recorded at each receiver station. Proper combination of the pressure and velocity signals, in order to remove the component of the signal representing energy which is trapped in the water layer, can only be performed after scaling the velocity signal by a scale factor S given by $$S = \frac{(1+R)}{(1-R)},$$

where R is the water bottom reflectivity. Thus the scale factor requires determining the water bottom reflectivity, which depends upon the acoustic impedance of the bottom material. Since the acoustic impedance of the bottom material, and hence the water bottom reflectivity, can vary among different source and receiver locations, the scale factor can be expected to vary at different locations too. A "surface consistent" map of water bottom reflectivities gives the different values at different locations.

In the past, a calibration survey has been used to estimate the water bottom reflectivity R. In the dual sensor operations described above, an estimate of the water bottom reflectivity is made by collecting separate reference information, generated by shooting a small seismic source directly over the receivers. The collection of this survey data requires additional time and cost beyond the data acquisition phase of the survey.

U.S. Pat. Nos. 5,396,472 and 5,524,100, both issued to present co-inventor Paffenholz, assigned to the assignee of the present invention, and entitled "Method for Deriving Water Bottom Reflectivity in Dual Sensor Se:-smic Surveys", describe a method which allows the determination of the water bottom reflectivity directly from the production Dual Sensor seismic data rather than from additional calibration data, and describe the advantages of using this method over the prior art. The advantages include deriving water bottom reflectivity from production data without relying on the ratio of the first breaks and without being affected by clipped first signals. A third advantage is in providing a method of combining trace data to eliminate peg-leg reverberations. However, while the operator used in the Paffenholz patents acknowledges the existence of source and receiver side reverberations, it is assumed that the pertinent parameters, water bottom reflectivity and water depth, are similar at the source and the receiver locations. This does not yield a surface consistent map of reflectivities.

SUMMARY OF THE INVENTION

The present invention is a method for determining surface consistent water bottom reflectivities using production Dual Sensor seismic data. Pressure signals and velocity signals are combined to generate combined signals having signal components representing downwardly-travelling energy substantially removed. The pressure and velocity signals correspond to seismic waves generated at source locations n in a water layer and detected by co-located pressure and velocity receivers, at receiver locations m in the water layer. The combined signals correspond to each pairing of source location n and receiver location m. The combined signals are transformed from the time domain to the frequency domain, generating transformed signals. A source peg-leg term and a receiver peg-leg term is calculated for each transformed signal, generating filtered signals. An optimization algorithm is applied to the filtered signals and uses the corresponding source and receiver peg-leg terms to determine the possibly different water bottom reflectivity values $R_n$ and $R_m$ at each of the source locations n and the receiver locations m, respectively.

BRIEF DESCRIPTION OF THE DRAWINGS

A better understanding of the benefits and advantages of the present invention may be obtained from the appended detailed description and drawing figures, wherein.

DESCRIPTION OF THE PREFERRED EMBODIMENTS

Figure 1:
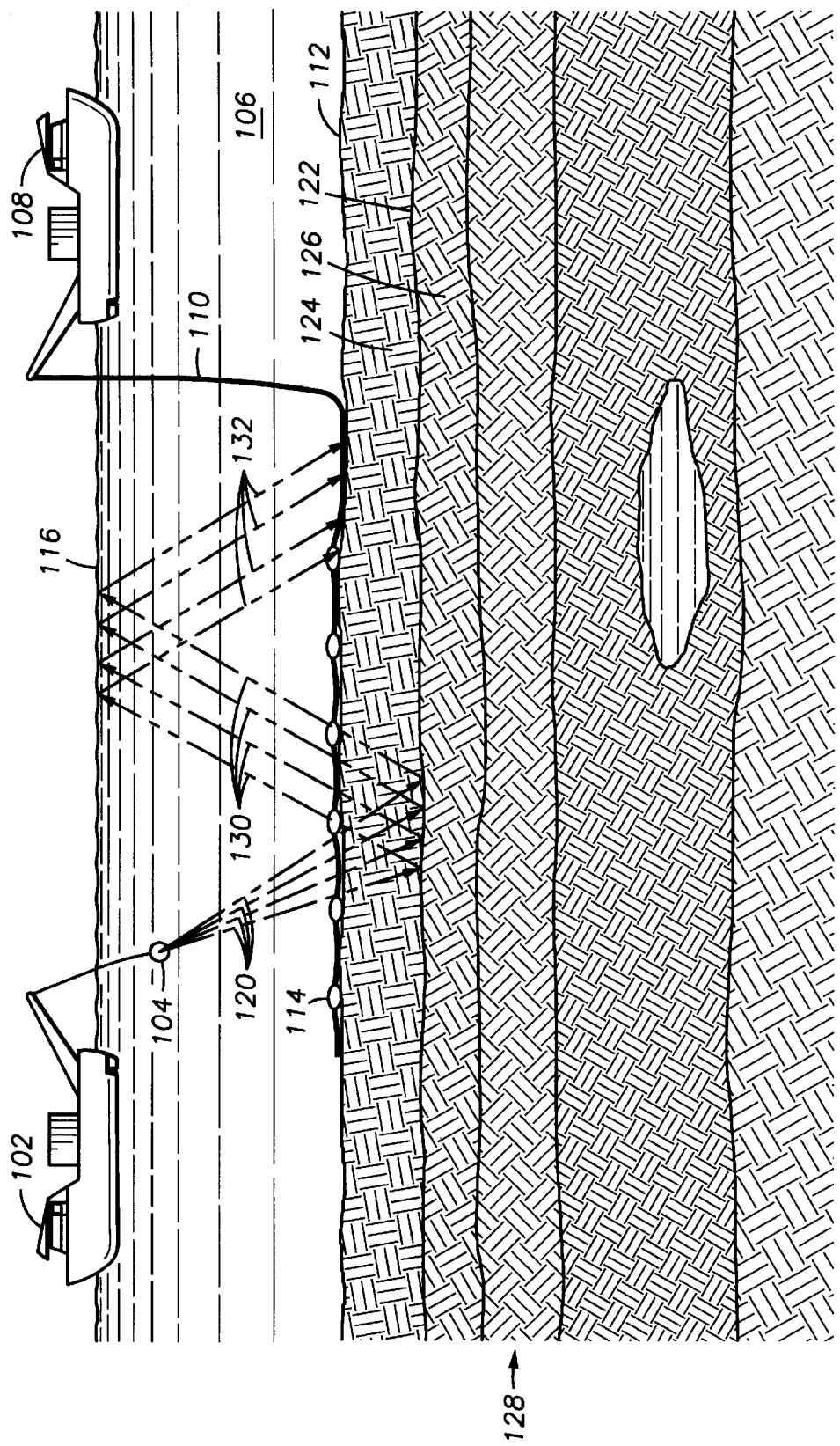
FIG. 1 is an illustration of apparatus used in a bottom cable operation.

FIG. 1 illustrates a preferred marine seismic survey system, generally designated by 100. The system 100 includes a seismic survey ship 102 that is adapted for towing a seismic energy source 104 through a body of water 106. The seismic energy source 104 is an acoustic energy source or an array of such sources. An acoustic energy source 104 preferred for use with the system 100 is a compressed air gun, constructed and operated in a manner conventional in the art. The system 100 also includes a receiving ship 108 that is preferably anchored in the body of water 106. The receiving ship 108 deploys one or more cables 110 on the marine bottom 112, and receives signals from the cables 110. The cables 110 carry at least one receiver 114 each, but normally include a plurality of receivers 114.

The receivers 114 include hydrophones for detecting water pressure and geophones for detecting water bottom particle velocity. More particularly, the hydrophones and geophones on the cables 110 are arranged so that each hydrophone has at least one gimballed geophone positioned next to it, when the cables 110 are deployed on the marine bottom 112. Electrical signals are sent to a recording system on the receiving ship 108 from the hydrophones and geophones. The survey ship 102 fires the source 104 at predetermined locations while the signals from the hydrophones and geophones are recorded. The signals are recorded by a multi-channel seismic recording system (not shown) that selectively amplifies, conditions and records time-varying electrical signals onto magnetic tape. Advantageously, the seismic recording system also digitizes the received signals to facilitate signal analysis. Those skilled in the art will recognize that any one of a variety of seismic recording systems can be used.

According to a preferred practice, the cables 110 and their associated receivers 114 carrying hydrophones and geophones are positioned on the marine bottom 112. Production shooting takes place with the survey ship 102 moving at a constant speed along a set of parallel lines, or swath, perpendicular to the cables 110. After the survey ship 102 completes the swath, the receiving ship 108 or other suitable ship retrieves the cables 110 and re-deploys the cables 110 in lines spaced from, but parallel to, the previous cable locations. Once the cables 110 are re-deployed, the survey ship 102 shoots another swath.

During data collection, seismic waves generated by the source 104 travel downwardly, as indicated by the rays 120. These primary waves are reflected off of interfaces between strata, such as the interface 122 between strata 124 and 126, in the subterranean earth formation 128. The reflected waves travel upwardly, as illustrated by the rays 130. The hydrophones and geophones which comprise the receivers 114 detect the reflected waves 130. The receivers 114 generate electrical signals representative of pressure and particle velocity changes in the seismic wave field, and transmit these generated electrical signals back to the survey ship 108 via the cable 110. The seismic recording system within the survey ship 108 records these electrical signals so that they can be subsequently processed to map the subterranean earth formation 128.

The receivers 114 detect both reflected waves of interest and unwanted reverberated waves which are noise. Reverberated waves are seismic waves which reflect off the water-air interface at the surface 116 of the water one or more times before finally traveling downwardly in the water 106 to impinge on the receivers 114. An example of reverberated waves is illustrated by the rays 132 in FIG. 1. Peg-leg reverberation waves contain at least one reflection from an interface 122 between strata in addition to the reverberations between the water surface 116 and the marine bottom 112. The order of the peg-leg is the number of reflections from interfaces between strata.

Figure 2:
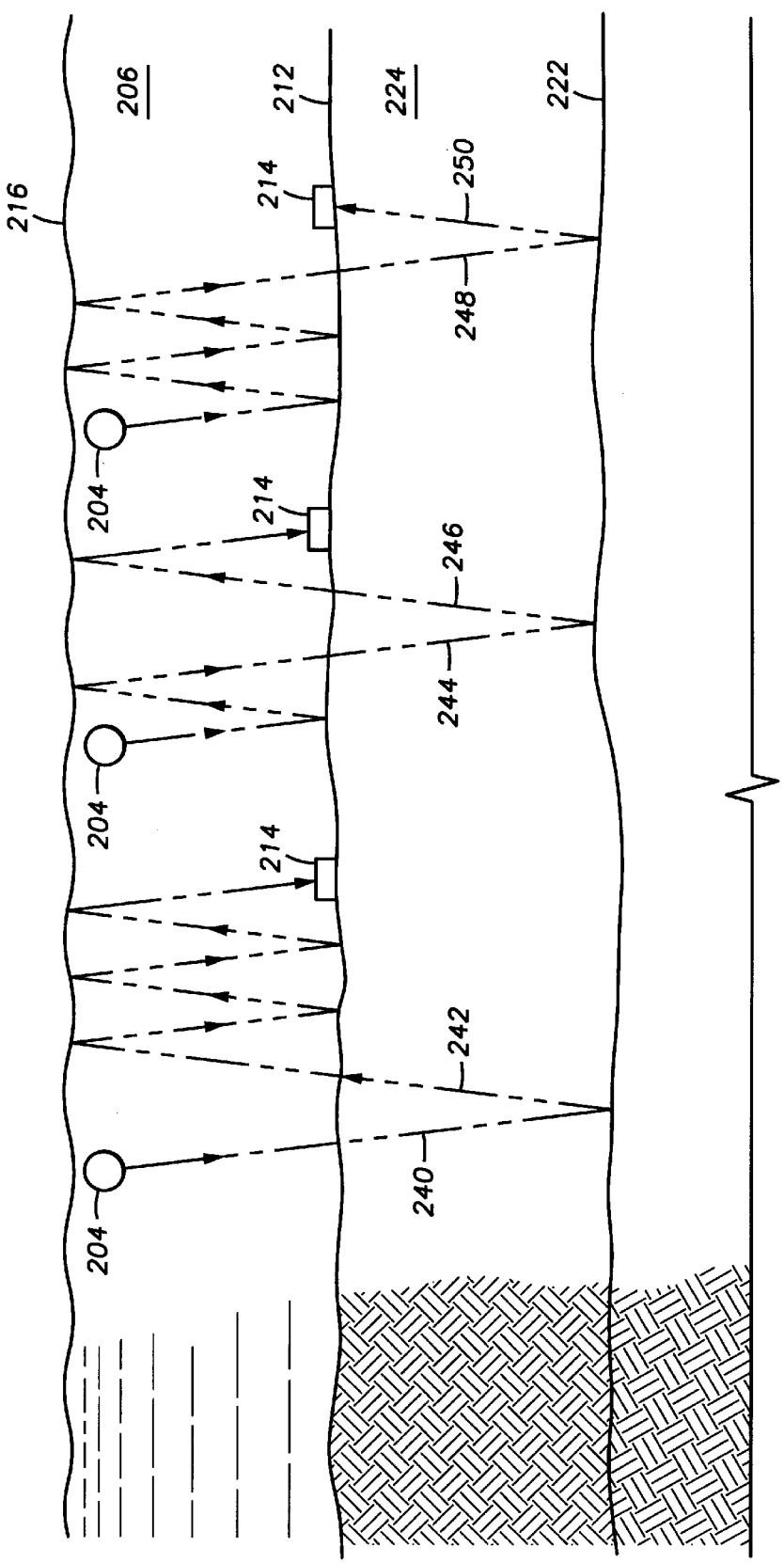
FIG. 2 is an illustration of source and receiver peg-leg reverberation sequences.

FIG. 2 illustrates three examples of first order peg-leg reverberation sequences. A first order peg-leg reverberation sequence is defined above as a seismic wave which reaches the subsurface interface 222 once in addition to water trapped reverberations. In the first example of FIG. 2, the downward travelling wave 240 from seismic energy source 204 travels downward through water layer 206 and strata 224 until reflecting up from interface 222, which provides a subsurface reflector. Next the upward travelling wave 242 travels back through strata 224 and water layer 206 to the water surface 216. Then the wave reverberates through the water layer 206 between the water surface 216 and the marine bottom 212 until it reaches receiver pair 214. This first example is called a "receiver peg-leg reverberation sequence" since the reverberations in the water layer 206 occur near the receiver 214 location. In the second example of FIG. 2, the downward travelling wave from seismic energy source 204 reverberates through the water layer 206 until the downward travelling wave 244 travels though water layer 206 and strata 224 and is reflected from interface 222. Then upward travelling wave 246 moves back through strata 224 and water layer 206 to water surface 216. There the wave again reverberates through the water layer 206 between the water surface 216 and the marine bottom 212 until it reaches receiver pair 214. The second example is a regular first order peg-leg reverberation sequence. In the third example of FIG. 2, the wave from seismic energy source 204 first reverberates through the water layer 206 between the water surface 216 and the marine bottom 212. Then the downward travelling wave 248 passes through water layer 206 and strata 224 until reaching interface 222. There the wave reflects and upward travelling wave 250 passes through strata 224 to receiver pair 214. This third example is called a "source peg-leg reverberation sequence" since the reverberations in the water layer 206 occur near the source 204 location.

The present invention is a method for determining water bottom reflectivities in cases where the water depths and the water bottom reflectivities are different at the source and receiver locations. The Paffenholz U.S. Pat. Nos. 5,396,472 and 5,524,100 show that if the pressure and velocity sensors are located on the water bottom, then the first order peg-leg reverberation sequences, P(Z) and V(Z), for the pressure and velocity sequences, respectively, can be expressed as $$P(Z) = \frac{1 - Z_R}{(1 + R_S Z_S)(1 + R_R Z_R)} \beta$$

and $$V(Z) = \frac{1 + Z_R}{(1 + R_S Z_S)(1 + R_R Z_R)} \beta$$

where
$Z_S$=the delay operator for a two-way trip in the water layer at the source location,
$Z_R$=the delay operator for a two-way trip in the water layer at the receiver location,
$R_S$=the water bottom reflectivity at the source location,
$R_R$=the water bottom reflectivity at the receiver location, and
$\beta$=the earth reflectivity sequence and the source wavelet.

Summation of the pressure and velocity signals gives only the up-going energy, Up(Z), thus eliminating the receiver ghost as follows:

$$P(Z) + V(Z) = Up(Z) = \frac{1}{(1 + R_S Z_S)(1 + R_R Z_R)} \beta. \quad (1)$$

The term $$\frac{1}{(1 + R_S Z_S)}$$

represents the peg-leg reverberation sequence at the source location and the term $$\frac{1}{(1 + R_R Z_R)}$$

represents the peg-leg reverberation sequence at the receiver location. The product term $$\frac{1}{(1 + R_S Z_S)(1 + R_R Z_R)} \quad (2)$$

is the split Backus operator. The regular Backus operator, or filter, $$\frac{1}{(1 + RZ)^2},$$

has been split into a source term and a receiver term in the split Backus operator of Eq. (2). This splitting allows the water bottom reflectivities at both source and receiver locations to be calculated by optimization procedures. Calculating the water bottom reflectivities at both source and receiver locations for each possible source and receiver pair leads to a surface consistent map of water bottom reflectivities.

The peg-leg source and receiver sequences can be eliminated by multiplying the up-going signal Up(Z) of Eq. (1) by the inverse split Backus filter $$(1+R_S Z_S)(1+R_R Z_R) \quad (3)$$

Eliminating the peg-leg source and receiver sequences in Eq. (1) minimizes the total energy in the up-going signal. Thus the determination of the water bottom reflectivities at the source and receiver locations translates into a search for the values $R_S$ and $R_R$ which result in the minimum signal power after multiplication with the inverse split Backus filter. Because the possible solution space is limited to water bottom reflectivity values between −0.9 and +0.9, an exhaustive search is feasible. In an exhaustive search, a series of values is selected which systematically covers the range of the possible solution space, such as values covering the range in equally-spaced increments.

The preferred implementation of the method involves the following processing sequence:

```
FOR ALL SHOT RECORDS
    FOR ALL NEAR OFFSET TRACES
        READ P-TRACE
        READ V-TRACE
        TIME WINDOW TRACES (E.G. 800-2000 MS BELOW FIRST BREAK)
        SUM WINDOWED TRACES (P + V) = UP
        COMPUTE SPECTRUM UP(Z) = FFT(UP)
        FOR ALL R_S = -0.9, 0.9, 0.1
            FOR ALL R_R = -0.9, 0.9, 0.1
                UP(Z) = UP(Z)*(1 + Z_S R_S)*(1 + Z_R R_R)
                COMPUTE TOTAL POWER IN SELECTED BANDWIDTH
                WRITE OUT SOURCE NUMBER, RECEIVER NUMBER,
                    R_S, R_R, POWER
            END
        END
    END
END
FOR ALL SELECT SOURCE-RECEIVER COMBINATIONS
    SELECT R_S, R_R WITH MINIMUM POWER
    CALCULATE AVERAGE VALUES OF R_S, R_R FOR SOURCE S, RECEIVER R
END
```

Figure 3:
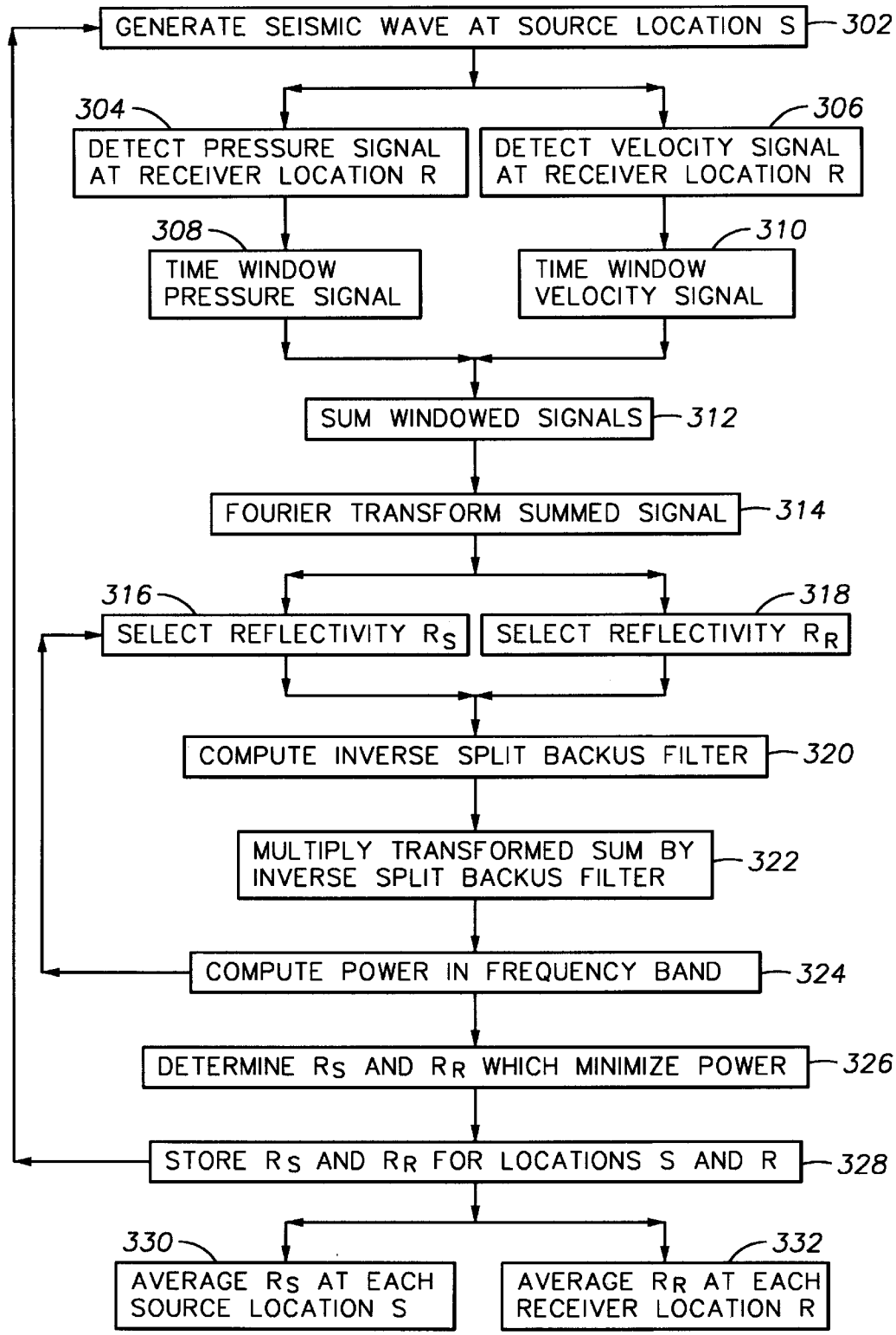
FIG. 3 is a flow diagram of the preferred implementation of the present invention using the inverse split Backus filter.

FIG. 3 illustrates a flow diagram which represents a preferred method of determining surface consistent water bottom reflectivities at different source and receiver locations. The preferred method illustrated is generally designated by 300. First, in block 302, a seismic signal is generated at a source location S. Next, in blocks 304 and 306, the pressure signal as a hydrophone data trace (P-trace) and the velocity signal as a geophone data trace (V-trace), resulting from the seismic signal of block 302, are obtained at a receiver location R. Next in blocks 308 and 310, a time window is applied to both the pressure signal from block 304 and the velocity signal from block 306, generating a windowed pressure signal and a windowed velocity signal, respectively. Preferably, the the window, counting from the first break appearing on each signal, is in the range of 0.8 to 2.0 seconds. Next, in block 312, the windowed pressure signal from block 308 and the windowed veocity signal from block 310 are summed to generate a summed signal representing the up-going energy signal, as described in Eq. (1). Then, in block 314, the summed signal from block 312 is transformed from the time domain to the frequency domain, preferably by applying a Fourier transform to the summed signal, generating a transformed signal. Next, in blocks 316 and 318, values of water bottom reflectivity at the source location, $R_S$, and water bottom reflectivity at the receiver location, $R_R$, are selected, preferably from a series of values defining an exhaustive search of the possible range of reflectivity values. In block 320, the inverse split Backus filter $(1+Z_S R_S)$ $(1+Z_R R_R)$ of Eq. (3) is computed for the selected water bottom reflectivity values $R_S$ and $R_R$ from blocks 316 and 318, respectively, and for delay operators $Z_S$ and $Z_R$ for the two-way travel time in the water layer at the source and receiver locations, respectively. In block 322, the inverse split Backus filter from block 320 is multiplied by the transformed signal, generating a filtered signal.

Next, an optimization algorithm is applied to the filtered signal from block 322 to determine the values of $R_S$ and $R_R$. A preferred method of optimization is to minimize the power of the filtered signal from block 322. In block 324, the power of the filtered signal is computed in a selected frequency band. Preferably, the frequency band is the range from 15 to 80 Hertz. In block 326, the values of $R_S$ arid $R_R$ are determined which minimize the total power of the filtered signal in the selected frequency band from block 324. In block 328, the values of $R_S$ and $R_R$ from block 326 are stored for the current source location S and receiver location R. Then the program logic loops back to read the traces for the next combination of source location S and receiver location R. In blocks 330 and 332, after traces for all the pairs of source and receiver locations are processed, the values of water bottom reflectivities $R_S$ and $R_R$ are averaged at each source location S and at each receiver location R.

An alternative embodiment of the present invention uses a surface consistent spectral decomposition of the trace spectra into source and receiver components. The decomposed spectra are then analyzed to estimate the water bottom reflectivities at the corresponding source and receiver locations. The spectrum of a seismic trace generated by a source at location n and recorded by a hydrophone at location m can be written in the frequency domain as the product:

$$P_{n,m}(f) = \left(\frac{1}{1 + R_n Z_n}\right)\left(\frac{1}{1 + R_m Z_m}\right)(1 - Z_m)\beta(f)$$

$$= S_n(f) \cdot R_m(f) \cdot G_m^P(f) \cdot \beta(f),$$

where $Z_n$ = the delay operator for a two-way travel time in the water layer at source location n, $Z_m$ = the delay operator for a two-way travel time in the water layer at receiver location m, $R_n$ = the water bottom reflectivity at the source location n, $R_m$ = the water bottom reflectivity at the receiver location m, and $\beta$ (f) = the earth reflectivity sequence and the source wavelet.

Here $$S_n(f) = \frac{1}{(1 + R_n Z_n)}$$

denotes the source peg-leg reverberation sequence at location n, $$R_m(f) = \frac{1}{(1+R_m Z_m)}$$

denotes the receiver peg-leg reverberation sequence at location m, and $$G^P_m(f) = (1-Z_m)$$

denotes the pressure ghost.

Similarly, the spectrum of each geophone trace recorded at location m can be written as:

$$V_{n,m}(f) = \left(\frac{1}{1+R_n Z_n}\right)\left(\frac{1}{1+R_m Z_m}\right)(1+Z_m)\beta(f)$$
$$= S_n(f) \cdot R_m(f) \cdot G^V_m(f) \cdot \beta(f),$$

where $$G^V_m(f) = (1+Z_m)$$

denotes the velocity ghost.

Summing the pressure and velocity traces gives the up-going wavefield, which can be written:

$$Up_{n,m}(f) = S_n(f) \cdot R_m(f) \cdot \beta(f).$$

The following treatment will be carried out for the up-going wavefield, but is not limited to it.

The objective is to extract the source and receiver peg-leg terms from the up-going wavefields. Let $N_R$ be the number of receiver locations and Ns be the number of source locations, or shots. There is one equation for each trace representing a source-receiver pair, therefore the number of equations is the product $N_R*N_S$. There are $N_R$ unknown reflectivity values $R_m$. and $N_S$ unknown reflectivity values $R_n$, so that the total number of unknowns is the sum $N_R+N_S$. Thus the number of equations is generally larger than the number of unknowns, so the set of equations can be solved in a least squares sense.

If the natural logarithm is taken, the equations assume the form:

$$\ln(Up_{n,m}(f)) = \ln(S_n(f)) + \ln(R_m(f)) + \ln(\beta(f)) \qquad (4)$$
$$= \ln\left(\frac{1}{1+R_n Z_n}\right) + \ln\left(\frac{1}{1+R_m Z_m}\right) + \ln(\beta(f))$$
$$= -\ln(1+R_n Z_n) - \ln(1+R_m Z_m) + \ln(\beta(f))$$

Any number of established linear algebra algorithms, such as the Gauss-Seidel method, can be used to decompose the spectra of Eq. (4) into source and receiver terms. Typically, only the amplitude spectrum is considered in such an operation and the phase term is ignored.

Once the amplitude spectrum of Eq. (4) is decomposed into source and receiver components, the water bottom reflectivities need to be extracted from the source and receiver spectra, respectively. Let the delay operators $Z_n$ and $Z_m$ for the two-way travel time in the water layer at source location n and receiver location m, respectively, be given by $$Z_n = e^{i\omega\tau_n}$$

and $$Z_m = e^{i\omega\tau_m}$$

where $\omega = 2\pi f$, $\tau_n$ = two-way travel time at source location n, and $\tau_m$ = two-way travel time at receiver location m.

Then the source component of the complex spectra is given by $$-\ln(1+R_m \cos \omega\tau_m + iR_m \sin \omega\tau_m)$$

and the receiver component of the complex spectra is given by $$-\ln(1+R_n \cos \omega\tau_n + iR_n \sin \omega\tau_n).$$

Therefore the source amplitude spectra are given by $$-\ln([(1+R_n \cos \omega\tau_n)^2 + (R_n \sin \omega\tau_n)^2]^{1/2}) \qquad (5)$$

and the receiver amplitude spectra are given by $$-\ln([(1+R_m \cos \omega\tau_m)^2 + (R_m \sin \omega\tau_m)^2]^{1/2}) \qquad (6)$$

The water bottom reflectivities $R_m$ and $R_n$ can then be extracted by determining the values which optimally fit the decomposed spectra of Eqs. (5) and (6) in a least squares sense.

Figure 4:
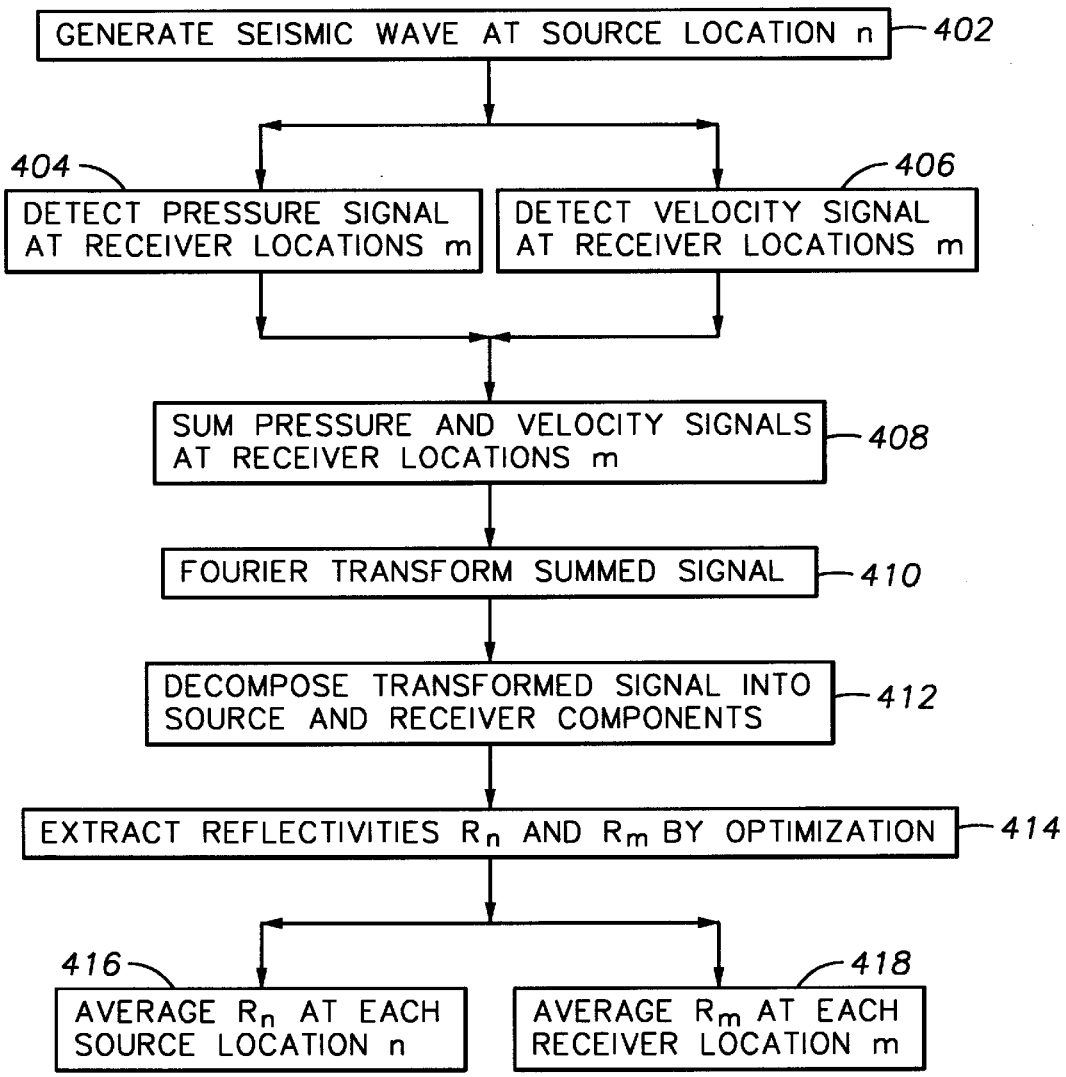
FIG. 4 is a flow diagram of the alternative implementation of the present invention using a spectral decomposition into source and receiver components.

FIG. 4 illustrates a flow diagram which represents the alternative embodiment of determining surface consistent water bottom reflectivities at different source and receiver locations. The alternative embodiment illustrated is generally designated by 400. First, in block 402, seismic waves are generated at $N_S$ source locations n. Next, in blocks 404 and 406, the seismic waves from block 402 are detected at $N_R$ receiver locations m by co-located pairs of hydrophones and geophones, generating corresponding pressure and velocity signals, respectively. Next, in block 408, the pairs of pressure and velocity signals from blocks 404 and 406 are summed at each receiver location m to generate summed signals for all source and receiver combinations. Next, in block 410, the summed signals from block 408 are transformed from the time domain to the frequency domain, preferably by applying a Fourier transform to the summed signals, generating transformed signals. In block 412, the transformed signals from block 410 are decomposed into source and receiver components. Next, in block 414, the $N_S$ water bottom reflectivities Rn at source locations n and $N_R$ water bottom reflectivities Rm at receiver locations m are extracted from the source and receiver components from block 412 by an optimization process. Finally, in blocks 416 and 418, the values for water bottom reflectivities $R_n$ and $R_m$ from block 414 are averaged at each source location n and at each receiver location m.

A preferred and an alternative embodiment of the present invention to estimate the water bottom reflectivities from production seismic data in a surface consistent way have been described. This allows the generation of an water bottom reflectivity map in the survey area which can subsequently be used to eliminate source and receiver side water column reverberations by deterministic deconvolution.

Figure 5:
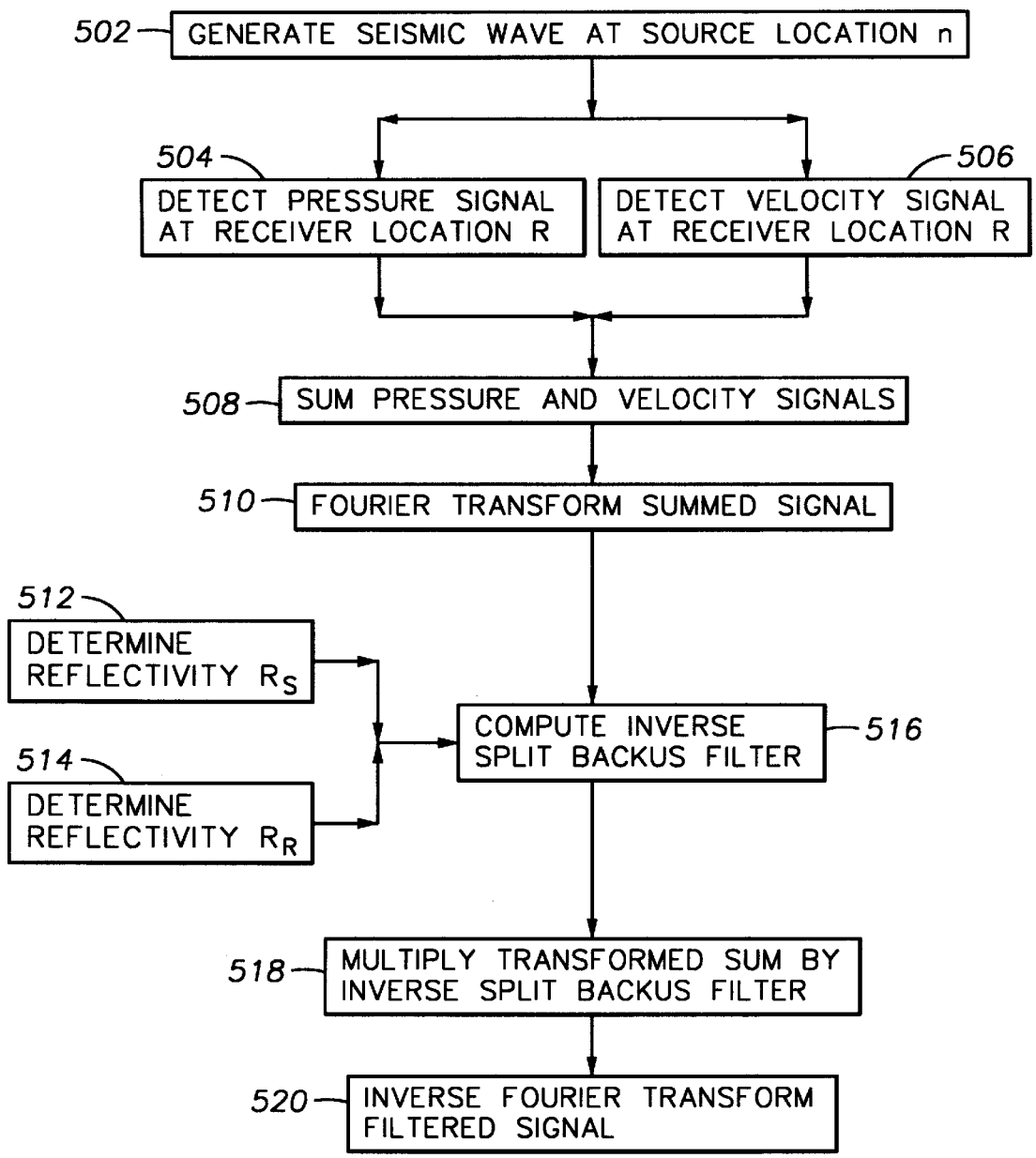
FIG. 5 is a flow diagram of the alternative implementation of the present invention for eliminating the peg-leg multiple sequence.

The analysis following Eq. (1) above indicates a method for attenuating the peg-leg multiple sequence. This method is shown in the flow diagram of FIG. 5. The method illustrated is generally designated by 500. First, in block 502, a seismic wave is generated at a source location S. Next, in blocks 504 and 506, the water pressure and water velocity corresponding to the seismic wave of block 502 are detected at a receiver location R. In block 508, the pressure and velocity signals of blocks 504 and 506 are summed to generate a summed signal representing the up-going energy signal, as described in Eq. (1). In block 510, the summed signal of block 508 is transformed from the time domain to the frequency domain, preferably by applying a Fourier transform to the summed signal, generating a transformed signal. In blocks 512 and 514, values of water bottom reflectivity $R_S$ at the source location S and water bottom reflectivity $R_R$ at the receiver location R are determined by appropriate means. In block 516, the inverse split Backus filter $(1+Z_S R_S)(1+Z_R R_R)$ is computed for the determined water bottom reflectivity values $R_S$ and $R_R$ from blocks 512 and 514, respectively, and from the delay operators $Z_S$ and $Z_R$ for the two-way travel time in the water layer at the source and receiver locations, respectively. Then, in block 518, the inverse split Backus filter of block 516 is multiplied with the transformed signal from block 510, generating a filtered signal. Finally, in block 520, the filtered signal from block 518 is transformed from the frequency domain to the time domain, preferably by applying an inverse Fourier transform to the filtered signal.

The present invention has been described with a certain degree of specificity. Variations will occur to those skilled in the art which are within the scope and spirit of the invention, which is limited only by the appended claims.

We claim:

1. A method for deterinining surface consistent water bottom reflectivities from dual sensor seismic data, comprising the steps of:

combining pressure signals and velocity signals to generate combined signals, said combined signals having signal components representing downwardly-traveling energy substantially removed, said pressure and velocity signals corresponding to seismic waves generated at each of at least one source location n in a water layer and detected by co-located pressure and velocity receivers at each of at least one receiver location m in said water layer, said combined signals corresponding to each pairing of source location n and receiver location m;

transforming said combined signals from a time domain to a frequency domain to generate transformed signals:, calculating an inverse split Backus filter for each of said transformed signals, and multiplying each of said transformed signals by a corresponding inverse Backus filter to generate filtered signals; and applying an optimization algorithm to said filtered signals to determine said water bottom reflectivity values $R_n$ and $R_m$ at said each of at least one source location n and said each of at least one receiver location m, respectively.

2. The method of claim 1, wherein said calculating step comprises the steps of:

calculating inverse split Backus filters $(1+R_n Z_n)(1+R_m Z_m)$ in the frequency domain for each of said transformed signals, where $R_n$ and $R_m$ are water bottom reflectivities at said each of at least one source location n and said each of at least one receiver location m, respectively, and $Z_n$ and $Z_m$ are Z-transforms of a two-way travel time delay filter in said water layer at said each of at least one source location n and said each of at least one receiver location m, respectively; and multiplying each of said transformed signals by said corresponding inverse split Backus filter to generate said filtered signals.

3. The method of claim 2, wherein said applying an optimization algorithm step comprises the steps of:

squaring amplitudes of a frequency spectrum of each of said filtered signals to generate squared signals;

summing said squared signals to generate power;

repeating said calculating, multiplying, squaring and summing steps, using different values for said water bottom reflectivities $R_n$ and $R_m$; and determining values for said water bottom reflectivities $R_n$ and $R_m$ which yield lowest value for said power.

4. The method of claim 3, wherein said determining values step is accomplished by selecting incremental values of $R_n$ and $R_m$ within a possible range of values.

5. The method of claim 3, wherein the summing step is performed in a restricted frequency band.

6. The method of claim 5, wherein said restricted frequency band is a frequency range of 15 to 80 Hertz.

7. The method of claim 1, further comprising the steps of:

generating averaged water bottom reflectivities by averaging said determined values $R_n$ for said water bottom reflectivities at said each of at least one source location n; and averaging said determined values $R_m$ for said water bottom reflectivities at said each of at least one receiver position m.

8. The method of claim 7, further comprising the step of:

using said averaged water bottom reflectivities to generate a surface consistent map of water bottom reflectivities.

9. The method of claim 1, further comprising the steps of:

applying a time window to each of said pressure signals to generate pressure signals for combining; and applying said time window to each of said velocity signals to generate velocity signals for combining.

10. The method of claim 9, further comprising the steps of:

determining a first occurrence time for first break of each of said pressure signals;

determining a second occurrence time for first break of each of said velocity signals; and placing said time window after said first occurrence time and said second occurrence time.

11. The method of claim 10, wherein said time window is in a range of 0.8 to 2.5 seconds after said first occurrence time and said second occurrence time.

12. The method of claim 1, wherein said calculating step comprises the step of:

spectrally decomposing said transformed signals to generate said source peg-leg term and said receiver peg-leg term.

13. A method for determining water bottom reflectivities in dual sensor seismic surveys, comprising the steps of:

generating seismic waves in at least one source location n in a water layer;

detecting water pressure in at least one receiver location m in said water layer and generating pressure signals indicative of said water pressure;

detecting water particle velocity at locations substantially near each said receiver location m in said water layer and generating velocity signals indicative of said water particle velocity;

combining said pressure signals and said velocity signals corresponding to each pairing of source location n and receiver location m to generate combined signals, said combined signals having signal components with downwardly-traveling energy substantially removed;

transforming said combined signals from a time domain to a frequency domain to generate transformed signals;

calculating an inverse split Backus filter for each of said transformed signals, and multiplying each of said transformed signals by a corresponding inverse split Backus filter to generate filtered signals; and applying an optimization algorithm to said filtered signals to determine said water bottom reflectivity values $R_n$ and $R_m$ at each said at least one source location n and each said at least one receiver location m, respectively.

14. The method of claim 13, wherein said calculating step comprises the steps of:

calculating inverse split Backus filters $(1+RnZn)(1+RmZm)$ in the frequency domain, where Rn and Rm are water bottom reflectivities at each said at least one source location n and each said at least one receiver location m, respectively, and Zn and Zm are Z-transforms of a two-way travel time delay filter in said water layer at said each said at least one source location n and said each said at least one receiver location m, respectively; and multiplying each of said transformed signals by said corresponding inverse split Backus filter to generate said filtered signals.

15. The method of claim 13, wherein said calculating step comprises the step of:

spectrally decomposing said transformed signals into source and receiver peg-leg terms, and generating therefrom inverse split Backus filters which are applied to corresponding ones of said transformed signals to produce said filtered signals.

16. A method for eliminating first-order peg-leg multiples in dual sensor seismic data, comprising the steps of:

combining a pressure signal and a velocity signal to generate a combined signal, said combined signal having signal components representing downwardly-traveling energy substantially removed, said pressure signal corresponding to seismic waves generated at source location S in a water layer and detected at receivier location R in said water layer, said velocity signal corresponding to seismic waves generated at said source location S in said water layer and detected at said receiver location R;

transforming said combined signal from a time domain to a frequency domain to generate a transformed signal:

determining a value $R_S$ and a value $R_R$ for said water bottom reflectivities at said source location S and said receiver location R, respectively;

calculating an inverse split Backus filter $(1+R_S Z_S)(1+R_R Z_R)$ in the frequency domain for said determined values $R_S$ and $R_R$ of water bottom reflectivities, where $Z_S$ and $Z_R$ are Z-transforms of a two-way travel time delay operator in said water layer at said source location S and said receiver location R, respectively;

multiplying said transformed signal with said inverse split Backus filter to generate a filtered signal; and transforming said filtered signal from the frequency domain to the time domain.

17. A method for eliminating first-order peg-leg multiples in dual sensor seismic surveys, comprising the steps of:

generating seismic waves at a source location S in a water layer;

detecting water pressure at a receiver location R in said water layer from said seismic waves and generating pressure signals indicative of said detected water pressure;

detecting water particle velocity at said receiver location R in said water layer and generating velocity signals indicative of said detected water particle velocity;

combining said pressure signals and said velocity signals to generate a combined signal, said combined signal having signal components representing downwardly-traveling energy substantially removed;

transforming said combined signal from a time domain to a frequency domain to generate a transformed signal;

determining a value $R_S$ and a value $R_R$ for water bottom reflectivities at said source location S and said receiver location R, respectively;

calculating an inverse split Backus filter $(1+R_S Z_S)(1+R_R Z_R)$ in the frequency domain for said determined values $R_S$ and $R_R$ of water bottom reflectivities, where $Z_S$ and $Z_R$ are the Z-transforms of a two-way travel time delay operator in said water layer at said source location S and said receiver location R, respectively;

multiplying said transformed signal with said inverse split Backus filter to generate a filtered signal and transforming said filtered signal from the frequency domain to the time domain.

18. The method of claim 12, wherein said spectrally decomposing step comprises the steps of:

representing a spectrum of a pressure trace in said frequency domain as a first product of a source peg-leg reverberation sequence, a receiver peg-leg reverberation sequence, a pressure ghost term, and an earth reflectivity sequence and wavelet term;

representing a spectrum of a velocity trace in said frequency domain as a second product of said source peg-leg reverberation sequence, said receiver peg-leg reverberation sequence, a velocity ghost term, and said earth reflectivity sequence and wavelet term;

summing said first product and said second product to form a summation signal;

taking a logarithin of said summation signal to generate representative signals; and applying a Gauss-Seidel method to decompose said representative signals into said source peg-leg term and said receiver peg-leg term.

* * * * *